United States Patent [19]

Bentley et al.

[11] 3,850,453

[45] Nov. 26, 1974

[54] METHOD AND APPARATUS FOR CONNECTING INSULATING CONDUITS

[75] Inventors: David R. Bentley, Temperance, Mich.; Neil A. Alexander, Toledo, Ohio

[73] Assignee: Questor Corporation, Toledo, Ohio

[22] Filed: Oct. 4, 1972

[21] Appl. No.: 294,850

[52] U.S. Cl.................... 285/47, 285/138, 285/187, 285/399
[51] Int. Cl............................................. F16l 11/12
[58] Field of Search ... 285/41, 302, 47, 199, 133 R, 285/403, 138, 399, 187; 138/114; 60/317, 318, 320, 322; 137/334, 340; 29/434, 455; 165/177

[56] References Cited
UNITED STATES PATENTS

| 724,210 | 3/1903 | Scherer | 138/114 X |
| 2,388,798 | 11/1945 | Parker | 285/403 X |
| 2,616,728 | 11/1952 | Pitt | 285/47 |
| 2,850,264 | 9/1958 | Grable | 285/302 X |
| 2,894,537 | 7/1959 | Carr | 285/133 R |

FOREIGN PATENTS OR APPLICATIONS

| 658,755 | 10/1951 | Great Britain | 285/133 R |
| 1,558,373 | 1/1969 | France | 285/199 |

Primary Examiner—Dave W. Arola

[57] ABSTRACT

The invention is disclosed herein in method and apparatus for connecting first and second insulating conduit means, each conduit having an inner tube to conduct exhaust gases, and an outer tube surrounding the inner tube and spaced therefrom. The inner tubes are sized to enable a sliding reception of an end of one inner tube into an end of another inner tube to provide a substantially gas-tight fit at the resultant overlap of the inner tubes. The outer tubes are sized to enable a sliding reception of an end of one outer tube into an end of the other outer tube to also provide an overlap portion. The normally cooler outer tubes are clamped together at the overlapped portion thereof to effect a mechanical tie between the first and second conduit portions while permitting the unclamped inner tubes to maintain a sliding connection in response to rising and falling temperatures of exhaust gases passing through the inner tubes. An insulating medium may be retained in the passage formed between the inner and outer tubes of the conduit portions by positioning retainers in the passage ends. One of the retainers is advantageously positioned to provide back-up support for the clamping of the outer tubes. The retainer is preferably formed with an inwardly opening channel to conserve weight and material, and to reduce heat transfer from the inner tube to the outer tube by conduction by reducing surface areas in contact. Each of the conduit portions may have similar retainers, in which instance the retainers are advantageously positioned adjacent each other so that both may provide back-up support for the clamping means on the outside of the overlapped portions of the outer tubes. Air or other fluid from a pressurized air or fluid system used in conjunction with the internal combustion engine may be connected for circulation through the passage formed between an inner tube and an outer tube to effect a heat exchange between the circulated air and the inner tube.

13 Claims, 5 Drawing Figures

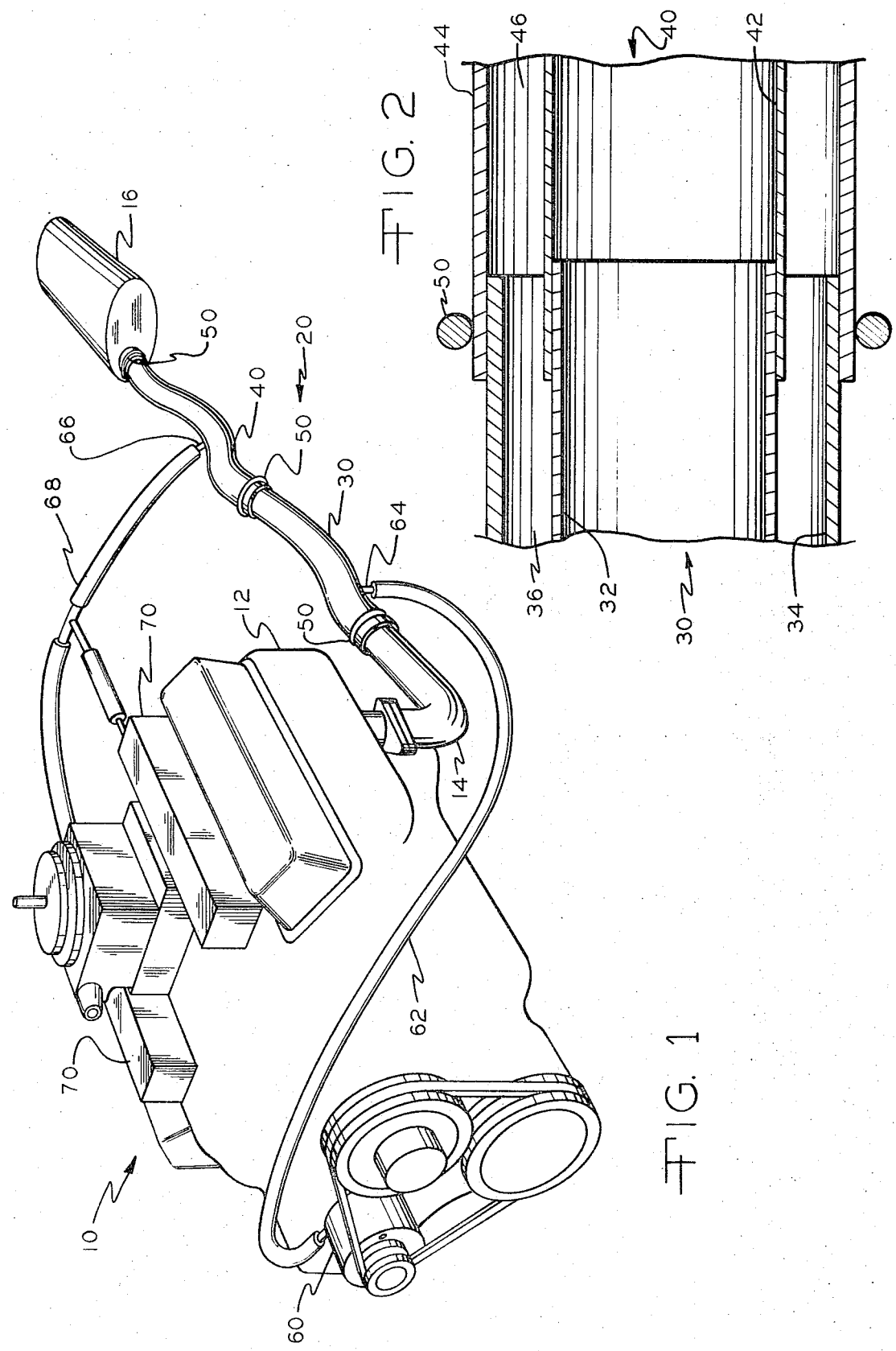

METHOD AND APPARATUS FOR CONNECTING INSULATING CONDUITS

BACKGROUND OF THE INVENTION

The problem of air pollution has become a national concern in recent years. To some extent this problem has been related to the exhaust fumes emitted by vehicles powered by internal combustion engines. Various emission control devices such as reactors, converters, oxidizing catalytic units, etc., have been devised to reduce the noxious emissions from the exhaust system. However, obtaining optimum operation of such emission control devices has been made somewhat difficult because of temperatures in the exhaust system which are too high under certain conditions and too low under other conditions.

In treating the carbon monoxide and hydrocarbon levels in the exhaust gases, it is necessary to provide an environment for the exhaust gases that will promote further oxidation. The emissions control devices must provide an environment to fulfil three main conditions. First, the environment must provide an excess amount of air well mixed with the unburned constituents in the exhaust. Secondly, the temperature of the gas mixture must be high enough to promote rapid oxidation. Finally, the reaction volume must be large enough to provide the residence time that will allow the oxidation to go to the desired degree of completion. The first condition can be satisfied by lean carburetion of the engine during certain driving conditions. This provides both an excess of oxygen as well as an essentially homogenous mixture. A difficulty, however, is that the temperature of the exhaust mixture goes down rapidly as the exhaust passes out of the cylinder and through the exhaust system so that further oxidation is quickly quenched. Heat loss must therefore be minimized, by insulating exhaust gases from the cold cylinder head walls and by insulating the exhaust manifold and exhaust pipe.

Further difficulties have been encountered in providing an insulated exhaust conduit in that, when insulation for the exhaust conduit is provided, problems arise with connecting one or more portions of the exhaust conduit together without losing the insulation properties desired and without providing an undue strain on the exhaust conduit connection.

Accordingly, it is an object of this invention to provide an improved method and apparatus for connecting dual wall insulating conduit means.

It is a further object of this invention to provide an improved method and apparatus for connecting insulating conduit means which have an inner tube and an outer tube surrounding the inner tube and spaced therefrom, while avoiding the problems which arise because the inner tube will have a substantially higher temperature than the somewhat cooler outer tube, thus causing contraction and expansion problems.

It is a still further object of this invention to provide an improved exhaust conduit system for an internal combustion engine which has an exhaust manifold and a muffler to provide an insulating environment to retain sufficient sensible heat to enable the proper operation of emissions control devices being utilized with the internal conbustion engine.

SUMMARY OF THE INVENTION

The above objects and features of this invention have been illustrated herein in preferred embodiments of apparatus for controlling the retention of sensible heat in an exhaust conduit system. A first conduit means includes a smaller first inner tube and a larger first outer tube surrounding and spaced from the first inner tube. A second conduit means includes a second smaller inner tube and a second larger outer tube surrounding and spaced from the second inner tube. The first and second inner tubes are sized to enable a sliding reception of an end of one inner tube into an end of the other inner tube to provide a substantially gas-tight joint at the resultant overlap of the inner tubes. The first and second outer tubes are sized to enable a sliding reception of an end of one outer tube into an end of the other outer tube to connect the first and second conduit means at the resultant overlap of the outer tubes.

Clamping means extends perimetrically around the outside of the overlapped portion of the outer tubes for mechanically tying or clamping together cooler outside tubes in a fixed joint, thereby holding the exhaust conduit system together mechanically while enabling the inner tubes to maintain a sliding connection, in response to expansion and contraction from exposure to hot exhaust gases when the engine is running, and to ambient temperature when the engine is not running.

The end of the inner tube conducting gases from the upstream side of the conduit advantageously overlaps and extends inside of the end of the inner tube conducting gases downstream, to reduce turbulence and tube end wear of the inner tubes.

An insulating medium may be confined in the passage formed between the inner and outer tubes of the first and second conduit means. The insulating medium may be a gas which is trapped in closed passages or which may be circulated into one end of, through, and out the other end of the passage to effect a heat transfer between the insulating gas and the exhaust gases. Alternatively, the insulating medium may include or consist entirely of suitable high-temperature resistant solids which are known in the art.

Means may be provided which extend perimetrically around the inside of one of the outer tubes at the overlap portion of the outer tubes to provide a back-up support means beneath the clamping means. The back-up support means may be a solid ring or may be a channel-shaped member having the channel opening inwardly or outwardly.

The back-up support means advantageously extends from the inside wall of the outer tube to the outside wall of the inner tube of the conduit means, to retain a predetermined spacing condition between the inner and outer tubes, and to also retain an insulating medium in the passage between the inner and outer tubes. Each of the first and second conduit portions may have such a retaining means and spacing means. If this embodiment is chosen, the spacing means of each conduit means are advantageously positioned adjacent each other when the ends of the conduit means are assembled to enable both of the spacing means to provide support for the clamping means.

Other objects, advantages, and features of this invention will become apparent when the following description is taken in conjunction with the accompanying drawings, in which:

FIG. 1 is a diagrammatic view in perspective of a system utilizing the teachings of this invention on an internal combustion engine;

FIG. 2 is a cross-sectional view taken longitudinally of the connection of two of the conduit means of this invention;

DESCRIPTION OF THE PREFERRED EMBODIMENTS

Figure 3:
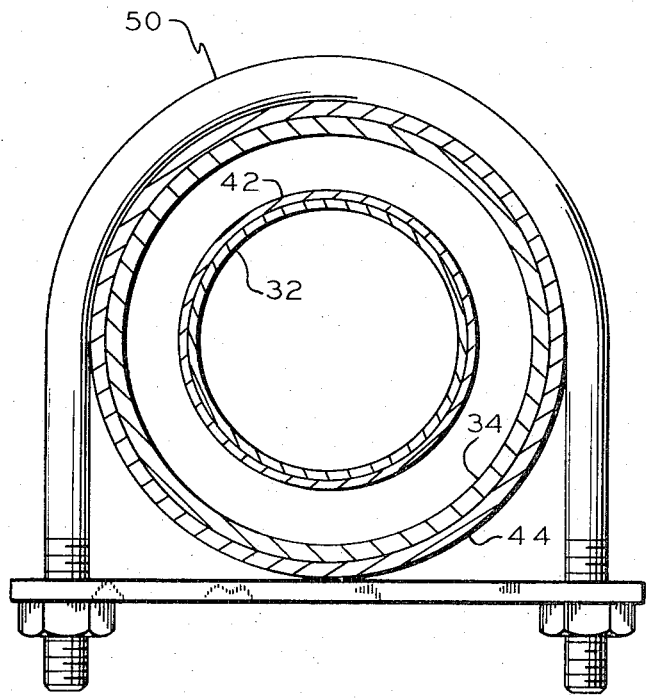
FIG. 3 is a transverse cross-sectional view of the apparatus of FIG. 2.

Referring to FIG. 1 there is illustrated an internal combustion engine 10 which has an exhaust manifold 12, an exhaust manifold outlet header connecting means 14 and a muffler 16. An insulated exhaust gas conduit means connecting the exhaust manifold and the muffler 16 is indicated generally at 20. For the purposes of clarity emission control devices that may be utilized in connection with the exhaust system gases have been omitted from the drawing, but their use with the apparatus illustrated in FIG. 1 is well known to those skilled in the art and need not be detailed here.

The exhaust gas conduit means 20 may comprise first and second portions 30 and 40 that are connected together, to the exhaust manifold, and to the muffler by clamping means 50.

Referring to FIG. 2 it may be seen that the first portion of the conduit means 30 comprises a smaller inner tube 32 surrounded by a larger outer tube 34 which is spaced from the inner tube 32 by an air gap 36. Similarly, the second portion 40 comprises a smaller inner tube 42 and a larger outer tube 44 spaced from the inner tube 42 by an air gap 46. The air gaps 36 and 46 may be dead air space to provide insulation between the inner tubes 32, 42 and the outer tubes 34, 44. Alternatively, air from an air pressure system on the internal combustion engine may be circulated through the air gaps 36, 46 to effect a heat transfer exchange between the exhaust gases flowing inside the inner tubes 32, 42 and the circulating air, to preheat the air.

Referring again to FIG. 1 it may be seen that air from an air pressure supply such as a pump 60 driven by the engine may be diverted partially or wholly through a conduit 62 to a fitting 64 which communicates with the air gap 36 of the conduit portion 30. Air is transmitted or circulated along through the air gaps 36, 46, and exits as preheated air from a fitting 66 in conduit portion 40 and is directed through a conduit means 68 for use after preheating, as in an injection system 70 to provide a parallel-flow heat exchanger. Reversing the connections to the fittings 64, 66 would provide a counter-flow heat exchanger which in most instances is the preferred embodiment.

The inner tubes 32, 42 are sized to enable a sliding reception of an end of one inner tube 32 into the other inner tube 42 to provide a substantially gas-tight joint at the resultant overlap of the inner tubes 32, 42. It is preferable that the end of the inner tube 32 conducting gases from the upstream side of the inner tube overlap extends inside the end of the inner tube 32 conducting gases downstream, so that turbulence at the joint is reduced, tube end wear or erosion of the tubes is reduced, and to reduce the likelihood of leaks at the joint.

The outer tubes 34, 44 are sized to enable a sliding reception of an end of the tube 34 into an end of the tube 44 to connect the first and second conduit means 30, 40 at the resultant overlap of the outer tubes. A close, gas-tight fit is not required in this instance since the clamping means 50, shown herein as a common U-clamp, will close any space between the outer tubes 34, 44 and mechanically connect the sections 30, 40 together.

While a common U-clamp 50 has been shown for clamping or connecting the portions 30, 40 together, it is to be realized that other clamps may be utilized, including those having hanger sections and other connecting means for suspending the exhaust system from the underside of the vehicle. However, it is important to note that the invention requires use only of a common clamp readily available and relatively inexpensive.

After an engine is started and warmed up, the gas temperature of exhaust gases flowing through the inner tubes 32, 42 may rise from ambient to temperatures in the range of 1,800°F. The wall temperatures of the tubes 32, 42 may then be approximately 1,750°F. Because of the insulating effect of the air gap, dead air space or other insulating medium as will be described hereinafter, a temperature gradiant of 700° to 1,000°F. may exist across the cross section of the exhaust gas conduit system between the inner wall of the inner tubes and the outer wall of the outer tubes. Thus, it can be seen that the sensible heat required may be maintained within the exhaust system to enable efficient operation of emission control devices requiring temperatures within a predetermined range.

The clamp 50 extends perimetrically around the outside of the overlap portion of the outer tubes 34, 44 and clamps the much cooler outside tubes together in a fixed joint. However, the much warmer inner tubes which are subject to much more expansion and contraction due to the extreme temperature ranges to which they are exposed, are free to maintain a sliding connection in response to the expansion and contraction from the exposure to exhaust gases ranging in temperature from ambient to 1,800°F. Thus, a sliding seal is maintained by the inner tubes while the outer portions are firmly, mechanically connected to support the system.

Connections similar to that shown in FIG. 2 may be made to the exhaust header outlet means 14 and to the muffler 16. Alternatively, special fittings may be supplied in either the exhaust manifold outlet header means 14 and/or on the inlet of the muffler 16 to support the inner pipe or tubes. If an insulating medium is being used in the air gap 36, then the inlet to the air gap 36 would be blocked by an insulation retention member. If no insulating medium is utilized it would be necessary to block entry of the exhaust gases into the air gaps 36, 46.

Figure 4:
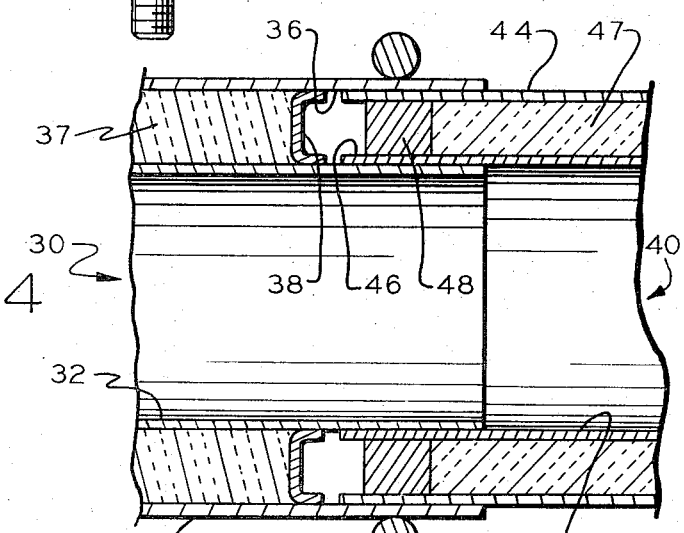
FIG. 4 is a longitudinal cross-sectional view of a second embodiment of the teachings of this invention.

Referring now to FIG. 4 there is illustrated an alternative embodiment of the teachings of this invention in which an insulating medium 37, 47 has been provided in the air gap spaces 36, 46 between the dual wall conduit means. An insulation retention cap 38 is supplied in the air gap 36 to prevent the insulation from coming out before the joint is assembled. Similarly, an end cap or insulation retainer 48 is utilized in the air gap 46 to prevent the insulating medium 47 from coming out of the passage before assembly. The insulation mediums 37, 47 may be of any suitable high-temperature resistant solids, whether of a fibrous packed mixture, a solid, a porous formed mixture, or the like.

In addition to acting as insulation retainers, the elements 38, 48 may also act as spacers to hold the inner and outer tubes in a desired predetermined relationship for easy assembly. If it is not desired to circulate air through the air gaps 36, 46 as is illustrated in FIG. 2 and in FIG. 1, similar spacers may be utilized in the embodiment of FIGS. 2 and 3. However, spacers with air passages formed therethrough may be used to provide spacing of the tubes and still permit circulation of a fluid through air gaps 36, 46 for heat exchange purposes.

In the embodiment of FIG. 4 the retainer 48 is a solid piece of metal formed, in this instance, as an annulus and extends from the inside of the outer tube to the outside of the inner tube of the portion 40 to space and to retain insulation 47, and is positioned to act as a back-up ring to provide support for the clamping means 50 so that more mechanical connecting force may be applied to make the joints more mechanically rigid.

Figure 5:
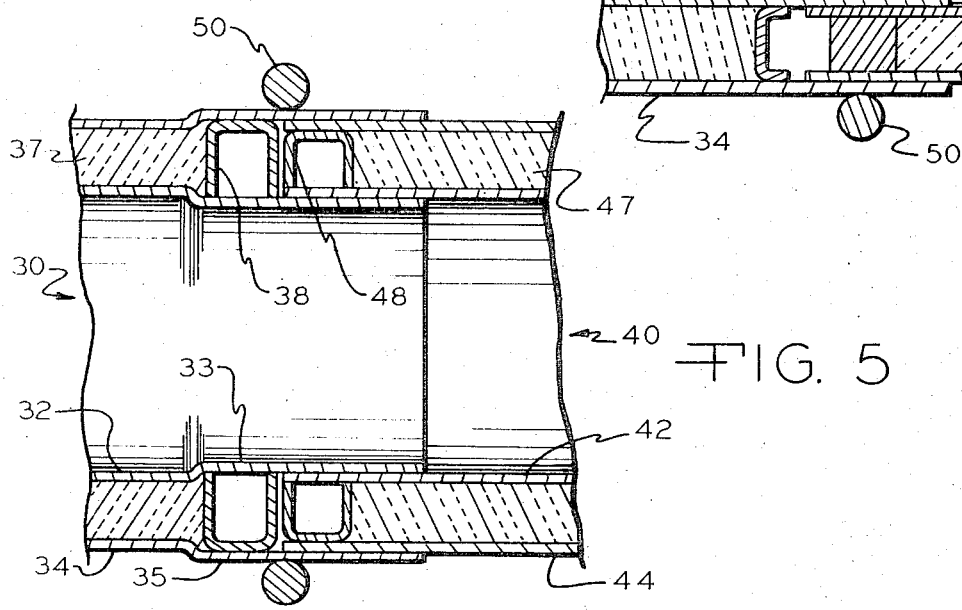
FIG. 5 is a longitudinal cross section of a third embodiment of the teachings of this invention.

Referring now to FIG. 5 there is illustrated a third embodiment of the teachings of this invention in which insulation retainers 38, 48 are again utilized. However, in this instance the insulation retainers are formed with channel-shaped cross sections with the channel opening inwardly toward the center of the conduit. This provides superior strength for the spacers enabling them, when abutted closely together as shown in FIG. 5, to also act as back-up support means for the clamping means 50 while conserving weight and material.

In the embodiment of FIG. 5 the end of the inner tube 32 is flared inwardly at 33 while the end of the outer tube 34 is flared outwardly at 35 to enable both the outer tube 44 and the inner tube 42 of the conduit portion 40 to be slipped directly into the flared recess formed by the flared ends 33, 35. Alternatively, the inner diameter of the tube 32 may be maintained as the same size as that shown at the flared portion 33 throughout its length, while the inner diameter of the outer tube 34 may also be maintained at the same diameter as that shown for the flared portion 45 throughout its length, to enable reception of the inner tube and outer tubes 42, 44 without the necessity of mechanically forming the ends of the portion 30.

There has thus been disclosed and described herein an exhaust conduit system for an internal combustion engine for connecting an exhaust manifold, a muffler and/or a vehicle emissions control device which provides insulation to maintain the sensible temperatures required for the proper operation of the emissions control device.

In conclusion, it is pointed out that while the illustrated examples constitute practical embodiments of our invention, we do not limit ourselves to the exact details shown, since modification of these details may be made without departing from the spirit and the scope of this invention.

We claim:

1. Apparatus for conducting vehicle engine exhaust gases and insulating the conducted gases from ambient external temperatures including first and second conduits in an assembled relationship, comprising
   a. a first conduit means including a smaller first inner tube and a larger first outer tube surrounding and spaced from said first inner tube,
   b. a second conduit means including a second smaller inner tube and a second larger outer tube surrounding and spaced from said second inner tube,
   c. said first and second inner tubes being sized to enable a reception of an end of one inner tube into an end of the other inner tube to provide a slidable connection of said two inner tubes while maintaining a substantially gas-tight joint at the resultant overlap of the inner tubes,
   d. said first and second outer tubes being sized to enable a sliding reception of an end of one outer tube into an end of the other outer tube to connect the first and second conduit means at the resultant overlap of the outer tubes while maintaining an insulating space between said inner and outer tubes,
   e. means extending perimetrically around the outside of the overlapped portion of said outer tubes for clamping the cooler outside tubes together thereby effecting a mechanical tie between the outer tubes of said first and second conduit means and preventing relative movement therebetween said inner tubes having no restraining connection to said outer tubes throughout their length thereby enabling the inner tubes to maintain a sliding longitudinal connection in response to expansion and contraction from exposure to exhaust gases, thus confining exhaust gases within the inner tube and maintaining the integrity of the insulating space to minimize heat loss to enable improved treatment of vehicle exhaust emissions, and
   f. means for supporting said inner tubes of said first and second conduit means within the outer tubes of said first and second conduit means.

2. Apparatus as defined in claim 1 which further includes means extending perimetrically around the inside of one of said outer tubes at the overlap portion of said outer tubes to provide a back-up support means beneath said clamping means.

3. Apparatus as defined in claim 2 in which said back-up support means is a solid ring.

4. Apparatus as defined in claim 2 in which said back-up support means is a channel-shaped member having the channel opening inwardly.

5. Apparatus as defined in claim 2 in which said back-up support means extends from the inside wall of the outer tube to the outside wall of the inner tube of a conduit means to retain a predetermined spacing between said inner and outer tubes.

6. Apparatus as defined in claim 5 which further includes an insulating medium confined in the passage formed between the inner and outer tubes of said first and second conduit means, said back-up means acting to retain said insulating medium in one of said conduits before assembly in said joint connection.

7. Apparatus as defined in claim 6 which further includes a spacing member extending between the inner wall of the outside tube and the outer wall of the inside tube of the other conduit means to retain the insulating medium in the passage between the inner and outer tubes of said other conduit means.

8. Apparatus as defined in claim 7 in which said back-up support means of said one conduit means and said spacing means of said other conduit means are positioned adjacent each other when the ends of the conduit means are assembled to enable said spacing means to also provide support for said clamping means.

9. Apparatus as defined in claim 8 in which the outer and inner tubes of one of said conduit means are spaced sufficiently far apart to enable the reception of both of the outer and inner tubes of the other of said conduit means therebetween.

10. A method for connecting first and second vehicle engine insulating conduit means in an assembled relationship, each conduit means having an inner tube and an outer tube surrounding the inner tube and spaced therefrom, to conduct exhaust gases from a vehicle engine to a muffler, comprising the steps of
  a. sizing said inner tubes to enable a reception of an end of one inner tube into an end of another inner tube to provide a slidable connection of said inner tubes while maintaining a substantially gas-tight fit at the resultant overlap of the inner tubes,
  b. sizing said outer tubes to enable a sliding reception of an end of one outer tube into an end of the other outer tube to provide an overlapped portion while maintaining an insulating space between inner and outer tubes, and
  c. clamping the cooler outer tubes together at the overlapped portion thereof to effect a mechanical tie between the outer tubes of said first and second conduit means to prevent relative movement therebetween and enclosing the insulating space between said inner and outer tubes, said inner tubes having no restricting connection to the outer tubes throughout their length to permit the unclamped inner tubes to maintain a sliding longitudinal connection in response to rising and falling temperatures of exhaust gases passing through said inner tubes, thus confining exhaust gases within the inner tube and maintaining the integrity of the insulating space to minimize heat loss to enable improved treatment of vehicle exhaust gases.

11. A method as defined in claim 10 which further includes the step of retaining an insulating medium in the passage formed between the inner and outer tubes of one of said conduit means by positioning a retainer in the passage beneath the clamping area to also provide back-up support for the clamping of the outer tubes.

12. A method as defined in claim 11 which further includes forming the retainer with an inwardly opening channel to conserve weight and material.

13. A method as defined in claim 11 which further includes the step of retaining an insulating medium in the passage formed between the inner and outer tubes of the other of said conduit means by positioning a second retainer in that passage near the end thereof to also enable the second retainer to provide back-up support for the clamping area.

* * * * *